March 28, 1933. L. W. HODGES 1,903,045
METHOD OF MANUFACTURING AN ELECTRIC WATER HEATER
Filed May 23, 1932
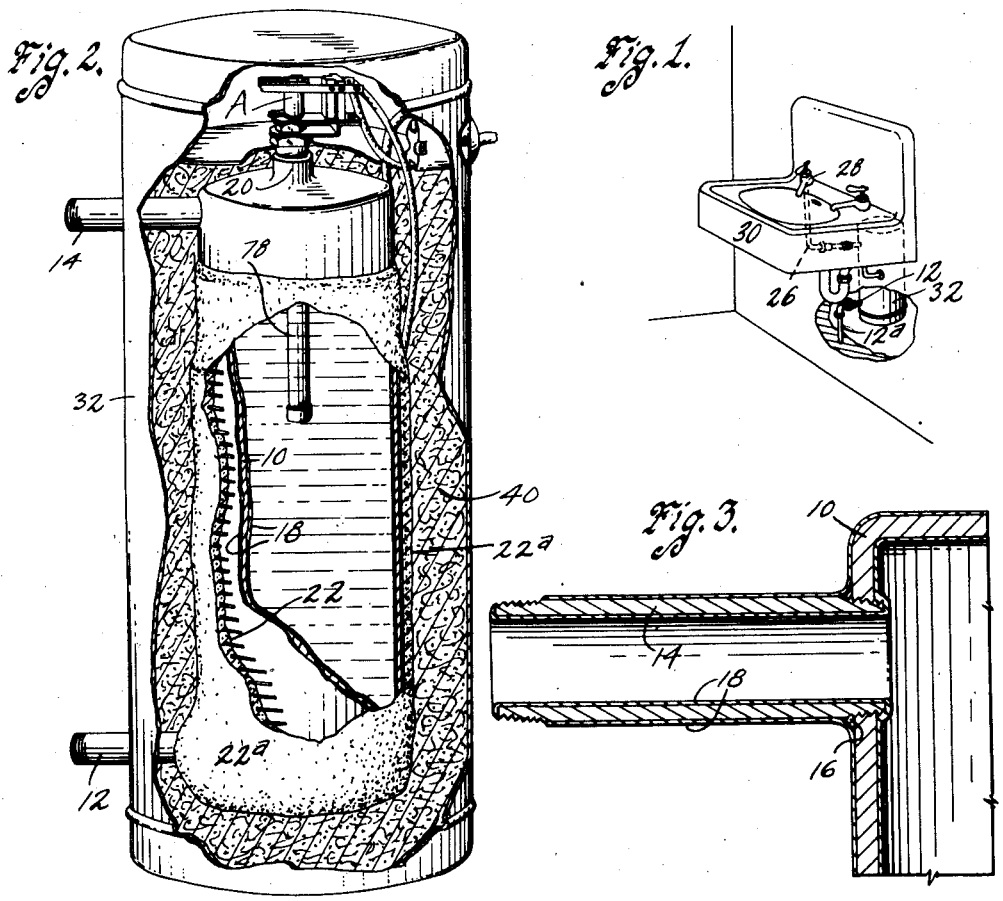
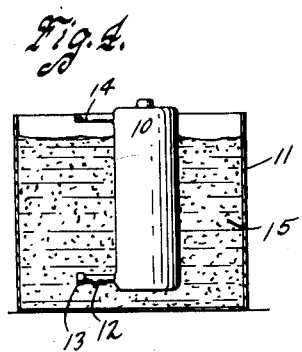
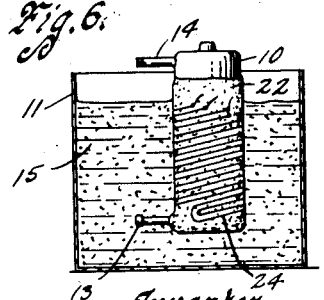

Patented Mar. 28, 1933

1,903,045

UNITED STATES PATENT OFFICE

LEE WALLIS HODGES, OF DEFIANCE, OHIO, ASSIGNOR, BY MESNE ASSIGNMENTS, TO LECTROLITE CORPORATION, OF DEFIANCE, OHIO, A CORPORATION OF OHIO

METHOD OF MANUFACTURING AN ELECTRIC WATER HEATER

Application filed May 23, 1932. Serial No. 612,975.

An object of my invention is to provide a method of manufacturing an electric water heater which is simple in its performance and by which an electric water heater can be made economically and durably.

A further object is to provide a process for manufacturing an electric water heater which is efficient because it is made in the form of an individual unit and includes an electric heating element so associated with a tank when made according to my process that a maximum degree of heat transmission from the heating element to water is secured with a consequent low temperature operation of the heating element which both lengthens its life and prevents the formation of scale within the tank, which is the condition usually encountered where an electric heating element is associated with a water tank.

A further object is to produce a water heater which is electrically heated by a heating element arranged with respect to a receptacle in which the water is heated so that the heat of the heating element, caused by energization thereof, is immediately absorbed by the water in the receptacle thus keeping the heating element below a glowing state which is the state in which most of the present day heating elements (especially those for the heating of water) operate.

Still a further object is to provide a method of producing a water heater comprising the enameling of a tank both interiorly and exteriorly, the coating thereof with plastic insulating material, the drying of the coating, the winding of a heating element on the coating and the application and drying of another coat of plastic insulating material over the heating element and the first coat together with a final step of water proofing the second coating.

A further object is to provide an article of manufacture comprising a water heater of simple, durable and inexpensive construction having the features mentioned.

With these and other objects in view, my invention consists in the method of manufacturing an electric water heater and in the steps of the method whereby the objects contemplated are attained and in an article of manufacture, as hereinafter more fully set forth, pointed out in my claim and illustrated in the accompanying drawing, in which:

Figure 1 is a perspective view of a lavatory with a hot water heater embodying my invention connected therewith.

Figure 2 is a perspective view of a complete hot water heater, parts being broken away and other parts being shown in section to illustrate the details of construction of the heater.

Figure 3 is an enlarged vertical sectional view of a portion of a hot water heater unit, showing the first step in the process, which step is the application of a coating of enamel upon the inside and outside of a tank and on nipple fittings associated therewith.

Figures 4, 5 and 6 illustrate additional, successive steps in the manufacture of the hot water heater unit.

On the accompanying drawing, I have used the reference numeral 10 to indicate a receptacle or tank made of steel or the like. A cold water inlet pipe 12 and a hot water outlet pipe 14 are screw threadedly associated with the tank 10. The pipes 12 and 14 are then welded as indicated at 16 (see Figure 3) to insure permanent non-leak assembly of the parts 10, 12 and 14 relative to each other.

After such assembly, the first step in the process of manufacturing the water heater consists of applying a coating of porcelain enamel 18 to both the interior and exterior of the tank 10 and the pipes 12 and 14.

The porcelain enamel coating is applied at a high temperature, such as 1600 degrees Fahrenheit.

A suitable preparation may be placed on the threads of the pipes 12 and 14 so that they do not become enameled in this step of the process. The enameling of the tank is provided to prevent any subsequent formation of rust within the tank to contaminate the water therein and to provide a smoother finished interior which discourages the formation of scale deposits, this condition always being present where other than soft water is used.

The next step in the process is to coat the exterior of the tank with a primary coating of plastic insulating material. In Figure 4, the pipe 12 has been capped with a cap 13 and the enameled tank 10 has been dipped in a tank 11 containing plastic insulating material 15. The insulating material 15 may be of clay-like substance or refractory heat conducting cement but should be a good electric insulator so that it will prevent any short circuit of current between the coils of an electric heating element later to be applied to the tank.

The tank 10 is then withdrawn from the plastic insulation material 15 and a coating 22 of the material adheres thereto. The thickness of the coating is determined by the consistency or fluidity of the material 14 in the tank 11.

The next step in the process is to dry the coating 22. This may be done by air drying, but more preferably by oven drying, especially drying at a high temperature in order to cure or bake the coating 22 and harden it so that it will retain its shape during subsequent manufacturing steps.

The next step in the process of manufacturing the water heater is to wind one or more electric resistance wires or heating elements 24 on the coating 22, as shown in Figure 5.

The heating elements 24 are preferably of loop formation so that the electromagnetic effect of one half of any given loop counteracts the electromagnetic effect of the other half and thus produces a non-magnetic heating element which avoids the possibility of the tank 10 acting as the secondary of a transformer and the heating element as the primary, thus inducing a heavy electric current in the tank which would be wasteful of electrical energy and detrimental to the tank itself.

It will be noted that the heating element is distributed to cover the major portion, at least, of the tank so that when energized there is a definite area of the tank from which the water within the tank can absorb heat as transmitted to the tank from the heating element. The heating element is separated from the tank by only the coating 22 of refractory cement so that the path of heat transmission is short and the results obtained by actual experiment have been to quickly heat the water and prevent the heating element from being heated to a glowing state. Obviously, this makes the heating element practically indestructible inasmuch as red or white heat of heating elements is the main cause of their eventual destruction.

After the heating element 24 is wound in position the tank 10 is again dipped in the plastic material 15 of the tank 11 as shown in Figure 6 for providing a second coating 22a on the coating 22 and covering the heating element 24. The coating 22a is then baked for rendering it non-plastic and hardening it on the heating element to retain the heating element in its wound position.

The final step of the process is to water proof the second coating 22a and this may be done by brushing or spraying water proofing material on the completed water heater unit and allowing it to air dry or baking it, according to the requirements for the particular water proofing material used.

Another satisfactory method of water proofing the coating 22a is to dip it while it is still hot in waterproofing material. More than one waterproof coating can be applied if found desirable to sufficiently insulate the heating element wound on the tank from contact with water or moisture.

The water heater unit after being thus completed is placed in a container 32 with insulation material 40 between the container and the heater unit. This prevents the escape of heat from the water heater to atmosphere and tends to drive all the heat from the heating element 24 to the tank 10 so that it can be absorbed by the water therein.

The tank 10 is provided with a boss 20 in which an automatic control switch A is screwed. The switch A has a temperature responsive element 78 extending into the water within the tank and the switch is connected in series with the heating element 24 so as to automatically control its operation.

The pipes 12 and 14 are connected with a cold water pipe 12a and a hot water faucet 28 respectively of a lavatory 30. The piping 26 extends from the pipe 14 to the faucet 28.

I have referred to the switch A only briefly. It, as well as other details of construction of my hot water heater, are fully disclosed in my co-pending patent application, Serial No. 604,557, filed April 11, 1932.

The combination of an enameled tank, a refractory embedded heating element distributed over the major portion of the tank and efficient insulation of the tank together with a short hot water travel from the tank to the hot water faucet, provides an electrically operated "instantaneous" hot water heater which is fully as economical as any hot water heater which serves several faucets and burns gas, oil or other fuel. Being electrically operated, the hot water heater is entirely fool proof and automatic and when once installed requires no further attention.

The heater unit, it will be obvious, can be readily manufactured according to my method and changes may be made in the method itself or in the steps for performing it without departing from the real spirit and purpose of my invention, and it is my intention to cover by my claim any modified forms of structure or use of mechanical equivalents, which may be reasonably included within their scope.

I claim as my invention:—

The method of making a water heater comprising applying a coat of initially plastic, heat conducting insulating material to the outside of the tank, the material having the property of drying rough and hard, drying the coat until it is hard, tightly winding around the coated tank a flexible electric coil which retains its wound shape and its position by virtue of the relative friction between the coat and the coil, applying a second coat of initially plastic material outside the first coat and the coil, and drying the second coat, the second coat, in drying, adhering to the first coat in a manner to protect the coil and the first coat.

LEE WALLIS HODGES.